(12) United States Patent
Liebaert

(10) Patent No.: US 7,361,205 B2
(45) Date of Patent: Apr. 22, 2008

(54) METHOD FOR PRODUCTION OF METALLIC ELEMENTS OF HIGH PURITY SUCH AS CHROMES

(75) Inventor: Philippe Liebaert, Rosult (FR)

(73) Assignee: Delachaux S.A., Gennevilliers (FR)

( * ) Notice: Subject to any disclaimer, the term of this patent is extended or adjusted under 35 U.S.C. 154(b) by 438 days.

(21) Appl. No.: 10/502,305

(22) PCT Filed: Jan. 20, 2003

(86) PCT No.: PCT/FR03/00164

§ 371 (c)(1),
(2), (4) Date: Nov. 15, 2004

(87) PCT Pub. No.: WO03/062479

PCT Pub. Date: Jul. 31, 2003

(65) Prior Publication Data

US 2005/0061109 A1    Mar. 24, 2005

(30) Foreign Application Priority Data

Jan. 21, 2002   (FR) .................................. 02 00678

(51) Int. Cl.
  *B22F 9/20* (2006.01)
(52) U.S. Cl. .............................. 75/351; 75/352; 75/369
(58) Field of Classification Search .................. 75/351, 75/352, 369
  See application file for complete search history.

(56) References Cited

U.S. PATENT DOCUMENTS

| 4,005,956 | A | * | 2/1977 | Inoue | 425/78 |
|---|---|---|---|---|---|
| 4,504,310 | A | * | 3/1985 | Boulier | 75/623 |
| 5,039,476 | A | * | 8/1991 | Adachi et al. | 419/13 |
| 5,540,750 | A | * | 7/1996 | Fernandez et al. | 75/235 |
| 6,695,960 | B1 | * | 2/2004 | Bacos et al. | 205/74 |
| 6,706,240 | B2 | * | 3/2004 | Habecker et al. | 419/33 |

FOREIGN PATENT DOCUMENTS

| EP | 0102892 | 3/1984 |
|---|---|---|
| WO | WO 01/13969 | 3/2001 |

OTHER PUBLICATIONS

XP-002215605, Apr. 15, 1974, Toyota Jidosha KK.

* cited by examiner

*Primary Examiner*—George Wyszomierski
(74) *Attorney, Agent, or Firm*—Blakely, Sokoloff, Taylor & Zafman LLP

(57) ABSTRACT

The invention relates to a method of producing granules made of high purity metal or metal alloy, in particular based on chromium, the method being characterized in that it comprises the steps consisting in: preparing a metal or a metal alloy having non-metallic inclusions essentially comprising oxides of the base metal; pelletizing the metal or the alloy with a reducing agent in order to form the pellets or tablets; treating the pellets or tablets in a vacuum in order to enable the reducing agent to react on the inclusions without substantial sublimation of the metal or the metals of the alloy; and eliminating a surface layer from the pellets or tablets. The invention is applicable to manufacturing mechanical parts out of superalloys.

17 Claims, No Drawings

METHOD FOR PRODUCTION OF METALLIC ELEMENTS OF HIGH PURITY SUCH AS CHROMES

The present patent application is a non-provisional application of International Application No. PCT/FR03/00164, filed Jan. 20, 2003.

The invention relates to a method of producing metals or metal alloys of high purity, and in particular metallic chromium.

Industry is requiring ever increasing quantities of metals and metal alloys of high purity for fabricating metal parts.

In document EP-0 102 892, the Applicant has described a method enabling various metals and alloys, in particular, chromium to be produced with high purity. That method comprises the steps consisting in:

a) preparing a metal or metal alloy in which the non-metallic inclusions are essentially oxides of the base metal;

b) grinding the resulting metal or metal alloy and mixing the ground metal or metal alloy with a pelletizing agent and a reducing agent in order to form pellets; and c) subjecting the pellets to reducing treatment in a vacuum under conditions of pressure and temperature that are adjusted so that the reducing agent reacts on the non-metallic inclusions, and so that there is no substantial sublimation of the treated metal or metals of the alloy.

By way of example, that method enables a product containing no more than 300 parts per million (ppm) to 400 ppm of total oxygen to be obtained without difficulty, the oxygen being in the form of about 200 ppm to 300 ppm alumina containing 100 ppm to 150 ppm oxygen and about 500 ppm at most of non-reduced chromium oxide containing about 150 ppm of oxygen. Consequently, that chromium is of high purity and is suitable for use in preparing superalloys that are usable in particular in the manufacture of noble parts for aviation turbo-engines.

That method has given and continues to give full satisfaction.

Nevertheless, there now exists a demand for metals and metal alloys of even greater purity.

An object of the invention is thus to provide metals and metal alloys of improved purity.

To this end, the invention provides a method of producing metal or metal alloy granules, comprising a step consisting in:

preparing a metal or a metal alloy having non-metallic inclusions essentially comprising oxides of the base metal;

pelletizing the metal or the alloy with a reducing agent in order to form the granules;

processing the granules in a vacuum so that the reducing agent reacts on the inclusions; and eliminating a surface layer from the granules.

The Applicant has discovered, surprisingly, that eliminating the surface layer increases the overall purity of the granules. This result appears to be paradoxical since surface elimination cannot have any effect on the core composition of the granules. Nevertheless, it can be explained by the fact that the concentration of impurities is greater at the periphery of a granule than in its center. Surface elimination thus removes a greater fraction of impurities. It thus turns out that this step of elimination, in particular by tribofinishing, is technically highly advantageous. In addition, it enables the appearance of the product to be improved.

The method of the invention may also present at least one of the following characteristics:

elimination comprises abrasion;

the method includes tribofinishing;

elimination is performed by means of a vibrating enclosure;

the thickness of the eliminated layer lies in the range 0.1 millimeters (mm) to 0.5 mm;

the metal is selected from chromium, titanium, vanadium, molybdenum, manganese, niobium, tungsten, and nickel, and the alloy comprises at least one of the above metals and/or boron;

the alloy is a ferro-alloy;

the preparation step makes use of an aluminothermic reaction between at least one metal oxide and divided aluminum;

the reaction is unbalanced due to a shortage of aluminum relative to the quantity of aluminum needed for a complete reaction so as to ensure that the metal or the alloy contains reducible non-metallic inclusions mainly constituted by inclusions of the oxide of the base metal;

after pelletizing, the granules are baked, in particular at a temperature lying in the range 200° C. to 230° C.;

the reducing treatment is performed in a vacuum oven; and after the reducing treatment, the product is cooled in a neutral atmosphere.

Other characteristics and advantages of the invention appear further from the following description of a preferred implementation.

In this example, the purpose is to produce metallic chromium of high purity by an unbalanced aluminothermic reaction. It mainly implements the following four steps a), b), c), and d).

Step a)

Chromium oxide ($Cr_2O_3$), potassium bichromate ($K_2Cr_2O_7$), and divided aluminum are introduced into an aluminothermic crucible lined with a refractory material. The chromium oxide is advantageously a commercially-available product having grain size lying in the range 0 to 15 micrometers (µm), while the divided aluminum and the potassium bichromate are constituted by grains smaller than 1 mm.

The chromium oxide and the potassium bichromate are present in stochiometric proportions for the aluminothermic reaction, whereas the aluminum is present with a shortage relative to the stochiometric proportion for the conventional aluminothermic reaction. This shortage of aluminum may lie in the range 0.5% to 8% by weight, and preferably in the range 2% to 5% by weight, of the stochiometric quantity.

These three ingredients are weighed out and mixed together carefully and then the reaction is initiated in the crucible in appropriate manner. The reaction temperature quickly reaches a value of about 2200° C., and at the end of the reaction, metal is recovered from the bottom of the crucible, with slag floating on top.

Step b)

The metallic chromium obtained in step a) is ground in an impact grinder, advantageously constituted by a hammer-type high energy grinder (moving hammers striking stationary hammers) until a fine powder is obtained that can pass entirely through a screen having a mesh size of 500 µm, and that does not pass through a screen having a mesh size of 77 µm.

In the present example, the grinding is purifying grinding that produces ventilation, i.e. sweeping by a certain flow of air. The air flow rate can be adjusted voluntarily in order to accentuate the purifying effect, if so desired. Similarly, this purifying effect can be associated with using screening or any other kind of selective separation to eliminate the finest particles in ground material, since the vast majority of the non-metallic inclusions released by the grinding are to be found concentrated in the finest particles.

The resulting purified chromium powder is then intimately mixed with a reducing agent and a pelletizing agent. The pelletizing agent is advantageously constituted by a mixture of Bakelite and an organic binder such as furfuraldehyde. The purpose of this agent is to facilitate making pellets at low temperature, with the Bakelite dissolved in the binder forming a cold adhesive, and also serving to facilitate subsequent polymerization of the Bakelite at higher temperature. Naturally, it is possible to use other thermosetting pelletizing agents and other solvents. The reducing agent is advantageously constituted by carbon black, and serves to add to the carbon in the Bakelite.

The respective quantities of these ingredients can be varied, but overall they are adjusted, with a small amount of excess, to match the residual oxygen content of the grounds. By way of example, the mixture of reducing agent and pelletizing agent may be constituted by 0.1% Bakelite, 0.3% furfuraldehyde, and 0.05% to 0.2% carbon black, these percentages being relative to the weight of the grounds.

The resulting mixture is shaped into pellets or tablets by means of a conventional compacting press, such as a pelletizing press with tangential wheels or a tablet press. After being pelletized, the mixture is baked at a suitable temperature (about 200° C. to 230° C.) in order to eliminate the organic binder and polymerize the Bakelite which forms a binder and imparts strength to the pellets or tablets.

Nevertheless, it should be observed that the baking temperature should be restricted to the minimum required so as to avoid any oxidation of the product.

Step c

The pellets or tablets obtained in the preceding step are then subjected to reducing treatment at 1100° C. to 1400° C. under a high vacuum of about $133 \times 10^{-4}$ pascals (Pa).

At the beginning of the vacuum heating cycle, the Bakelite decomposes at a certain temperature leaving a carbon skeleton that is added to the carbon black that was introduced into the mixture as a reducing agent. On reaching the treatment temperature, this carbon reacts on the oxygen in the $Cr_2O_3$ that remains in the material, but reacts hardly at all on the oxygen of the alumina $Al_2O_3$.

The vacuum in the treatment furnace is then taken to $133 \times 10^{-1}$ Pa by controlled sweeping of a non-oxidizing gas or a reducing gas, such as hydrogen, which has the particular feature of being practically insoluble in solid chromium.

Because of the relatively low vacuums and the relatively low temperatures imposed by chromium subliming, the treatment can take several hours before achieving almost complete reaction.

Step d)

During this subsequent step, a surface layer is eliminated from the pellets by light abrasion. This step is implemented specifically by tribofinishing. To do this, a tribofinishing machine is used that is constituted by a lined bowl which is set into vibration by means of unbalanced motors. Under the effect of the vibration, the pellets erode against one another.

Tribofinishing lasts for about 10 minutes. The thickness of the abraded layer lies in the range 0.01 mm to 0.5 mm.

Not only does this step contribute to improving the appearance of the pellets by polishing them, but it also eliminates a large quantity of the impurities.

The eliminated impurities are mainly $O_2$ and $N_2$.

The Applicant has performed experiments on 30 pairs of chromium pellet samples. The Applicant has measured the general content of atoms of oxygen, nitrogen, and carbon in one sample in each pair that was not subjected to tribofinishing. The same measurements were performed on the other sample of each pair after being subjected to tribofinishing. The results are summarized in the following table.

|  | O | N | C |  |
|---|---|---|---|---|
| Before tribofinishing | 391 | 36 | 184 | (1) |
| After tribofinishing | 360 | 30 | 180 | (2) |
| Difference | 31 | 6 | 4 | (3) |

In this table, "O", "N", and "C" represent atoms of oxygen, nitrogen, and carbon.

The values given represent the quantities of the components in parts per million.

Lines (1) and (2) give mean values taken over samples respectively with and without tribofinishing. Line (3) gives the difference between lines (1) and (2).

It can be seen that the mean improvement is 31 ppm for oxygen (i.e. 8%) and 6 ppm for nitrogen (i.e. 16%). It is not so good for carbon.

The tribofinishing step thus enables the purity of the pellets to be improved.

Naturally, the invention is not limited to the preferred implementation described above.

Thus, step a) can be performed other than by aluminothermically, e.g. silicothermically, or by reduction in an electric furnace, in order to obtain a metal or an alloy including non-metallic inclusions in the form of oxides of the base metal.

For a silicothermic reaction, mention can be made, as non-limiting examples, of producing ferro-chromium or metallic chromium by reduction with metallic silicon or silicon-chromium, and also of preparing ferro-tungsten or ferro-molybdenum by reduction with a high-content ferrosilicon or with metallic silicon.

For reduction in an electric furnace, mention can be made by way of non-limiting example, of producing ferro-vanadium in an electric furnace, followed by an aluminothermic reaction.

The elimination step may be implemented by means other than tribofinishing, for example by polishing, grinding with emery, shot-peening, or sand blasting.

Similarly, step a) can be performed other than by an aluminothermic reaction, for example by a silicothermic reaction, or by reduction in an electric oven, in order to obtain a metal or an alloy including non-metallic inclusions in the form of oxides of the base metal.

The invention claimed is:

1. A method of producing metal or metal alloy granules, in the method comprising:
    preparing a metal or a metal alloy having non-metallic inclusions comprising oxides of the base metal;
    pelletizing the metal or the alloy with a reducing agent in order to form the granules;
    processing the granules in a vacuum so that the reducing agent reacts on the inclusions; and
    purifying the granules by eliminating a surface layer from the granules,
    wherein the surface layer contains a greater concentration of impurities than a center of the granules.

2. The method according to claim 1, wherein the eliminating comprises abrasion.

3. The method according to claim 1, wherein the eliminating includes tribofinishing the granules.

4. The method according to claim 1, wherein the eliminating vibrating the granules in an enclosure.

5. The method according to claim 1, wherein the thickness of the eliminated layer lies in the range 0.1 mm to 0.5 mm.

6. The method according to claim 1, wherein the metal is selected from chromium, titanium, vanadium, molybdenum, manganese, niobium, tungsten, and nickel, and the alloy comprises at least one of the above metals and/or boron.

7. The method according to claim 1, wherein the alloy is a ferro-alloy.

8. The method according to claim 1, wherein the preparing makes use of an aluminothermic reaction between at least one metal oxide and divided aluminum.

9. The method according to claim 8, wherein the aluminothermic reaction is unbalanced due to a shortage of aluminum relative to the quantity of aluminum needed for a complete reaction so as to ensure that the metal or the alloy contains reducible non-metallic inclusions mainly constituted by inclusions of the oxide of the base metal.

10. The method according to claim 1, wherein after the pelletizing, the granules are baked at a temperature in the range 200° C. to 230° C.

11. The method according to claim 1, wherein the processing the granules is performed in a vacuum oven.

12. The method according to claim 1, wherein after the processing the granules, the product is cooled in a neutral atmosphere.

13. A method of producing metal or metal alloy granules, the method comprising:
    preparing a metal or a metal alloy having non-metallic inclusions comprising oxides of the base metal;
    pelletizing the metal or the alloy with a reducing agent to form the granules;
    processing the granules in a vacuum so that the reducing agent reacts on the inclusions; and
    purifying the granules by eliminating a surface layer from the granules by vibrating the granules in an enclosure,
wherein the surface layer contains a greater concentration of impurities than a center of the granules.

14. A method of producing metal or metal alloy granules, the method comprising:
    preparing a metal or a metal alloy having non-metallic inclusions comprising oxides of the base metal;
    pelletizing the metal or the alloy with a reducing agent to form the granules;
    processing the granules in a vacuum so that the reducing agent reacts on the inclusions; and
    eliminating a surface layer from the granules, wherein the thickness of the eliminated layer is in the range of 0.1 mm to 0.5 mm.

15. A method of producing metal or metal alloy granules, the method comprising:
    preparing a metal or a metal alloy having non-metallic inclusions comprising oxides of the base metal;
    pelletizing the metal or the alloy with a reducing agent to form the granules;
    processing the granules in a vacuum so that the reducing agent reacts on the inclusions; and
    purifying the granules by eliminating a surface layer from the granules, wherein the metal is selected from chromium, titanium, vanadium, molybdenum, manganese, niobium, tungsten, and nickel, and the alloy comprises at least one of chromium, titanium, vanadium, molybdenum, manganese, niobium, tungsten, and nickel and/or boron,
wherein the surface layer contains a greater concentration of impurities than a center of the granules.

16. A method of producing metal alloy granules, the method comprising:
    preparing a metal alloy having non-metallic inclusions comprising oxides of the base metal;
    pelletizing the alloy with a reducing agent to form the granules;
    processing the granules in a vacuum so that the reducing agent reacts on the inclusions; and
    purifying the granules by eliminating a surface layer from the granules, wherein the alloy is a ferro-alloy,
wherein the surface layer contains a greater concentration of impurities than a center of the granules.

17. A method of producing metal or metal alloy granules, the method comprising:
    preparing a metal or a metal alloy having non-metallic inclusions comprising oxides of the base metal;
    pelletizing the metal or the alloy with a reducing agent to form the granules;
    processing the granules in a vacuum so that the reducing agent reacts on the inclusions; and
    purifying the granules by eliminating a surface layer from the granules, wherein the preparing the metal includes an aluminothermic reaction between at least one metal oxide and divided aluminum, wherein the surface layer contains a greater concentration of impurities than a center of the granules.

* * * * *

UNITED STATES PATENT AND TRADEMARK OFFICE
CERTIFICATE OF CORRECTION

PATENT NO. : 7,361,205 B2 Page 1 of 1
APPLICATION NO. : 10/502305
DATED : April 22, 2008
INVENTOR(S) : Liebaert It is certified that error appears in the above-identified patent and that said Letters Patent is hereby corrected as shown below:

Col. 5, Claim 4, line 6, please insert -- includes -- after "eliminating".

Signed and Sealed this

Fifth Day of May, 2009

JOHN DOLL
*Acting Director of the United States Patent and Trademark Office*